US005617542A

United States Patent [19]

Williams

[11] Patent Number: 5,617,542

[45] Date of Patent: Apr. 1, 1997

[54] KEYBOARD TERMINAL WITH RAPID KEYED CHARACTER LOCAL DISPLAY THAT IS ALTERED IF CHARACTER TRANSMITTED TO HOST IS NOT TIMELY ACKNOWLEDGED

[75] Inventor: Richard G. C. Williams, San Diego, Calif.

[73] Assignee: British Telecommunications public limited company, London, England

[21] Appl. No.: 303,038

[22] Filed: Sep. 8, 1994

[30] Foreign Application Priority Data

Sep. 10, 1993 [EP] European Pat. Off. .............. 93307143

[51] Int. Cl.$^6$ .................................................. G06F 13/00
[52] U.S. Cl. ............................... 395/200.14; 395/200.19; 395/872; 395/118
[58] Field of Search .................................. 364/200, 519, 364/419, 419.08; 340/703; 395/887, 250, 200.14, 200.19, 872, 100, 55

[56] References Cited

U.S. PATENT DOCUMENTS

| | | | |
|---|---|---|---|
| 4,428,064 | 1/1984 | Hempy et al. .................... | 395/250 |
| 4,789,855 | 12/1988 | Ozeki ................................ | 340/703 |
| 4,823,288 | 4/1989 | Ueno et al. ....................... | 364/519 |
| 4,901,223 | 2/1990 | Rhyne ............................... | 364/200 |
| 5,182,709 | 1/1993 | Makus ............................... | 364/419 |
| 5,442,547 | 8/1995 | Kutsumi et al. .................. | 364/419.08 |

OTHER PUBLICATIONS

Patent Abstracts of Japan, vol. 14, No. 064 (P–1002) 6 Feb. 1990 & JP–A–01 286 011 (NEC Corp.) 17 Nov. 1989.
Patent Abstracts of Japan, vol. 017, No. 532 (P–1619) 24 Sep. 1993 & JP–A–05143 575 (PFU Ltd.) 11 Jun. 1993.
Patent Abstracts of Japan, vol. 017, No. 145 (E–1337) 24 Mar. 1993 & JP–A–04 311 125 (Shimadzu Corp) 2 Nov. 1992.
Patent Abstracts of Japan, vol. 012, No. 350 (P–760) 20 Sep. 1988 & JP–A–63 106 078 (NEC Corp) 11 May 1988.
Patnet Abstracts of Japan, vol. 010, No. 132 (P–456) 16 May 1986 & JP–A–60 254 263 (Toshiba KK) 14 Dec. 1985.
IBM, "Interface Protocol", IBM Technical Disclosure Bulletin, Oct. 1991, vol. 34, pp. 122–128.
Schwartz, "Telecommunication networks", 1987, pp. 121–124.

*Primary Examiner*—Thomas C. Lee
*Assistant Examiner*—Le Hien Luu
*Attorney, Agent, or Firm*—Nixon & Vanderhye P.C.

[57] ABSTRACT

Character codes input from a keyboard are transmitted to a remote computer which transmits the codes back by way of acknowledgement. A local display does not await the acknowledgement before displaying the characters but, rather, displays them right away and erases them if the acknowledgement is not received within a set period.

12 Claims, 3 Drawing Sheets

KEYBOARD TERMINAL WITH RAPID KEYED CHARACTER LOCAL DISPLAY THAT IS ALTERED IF CHARACTER TRANSMITTED TO HOST IS NOT TIMELY ACKNOWLEDGED

BACKGROUND OF THE INVENTION

1. Field of the Invention

The present invention relates to data transmission terminals.

2. Related Art

Such terminals commonly transmit characters entered by means of a keyboard, to a remote computer or other device. The remote computer acknowledges by echoing the transmitted character code and the terminal then displays the received character on a visual display screen. One problem that can arise with such an arrangement is that if the link between the terminal and the remote equipment is particularly slow (or the remote equipment is) there can be a long pause before keystrokes are echoed to the screen. This leads to users striking a key twice or more with obvious resulting problems.

Of course, it would be possible to echo the characters directly to the screen but the user then receives no feedback than his signals are reaching their intended destination.

SUMMARY OF THE INVENTION

According to the present invention there is provided a data communication terminal having a keyboard for input of characters, transmitter means for transmitting coded signals representing those characters, receiver means for receiving echoed characters as a form of acknowledgement, and visual display means operable to display characters, characterised by control means operable in response to an input signal from the keyboard to display the corresponding character on the visual display means and operable in the absence, within a defined time period, of receipt of a corresponding echoed character to erase the displayed character.

For example the terminal may include a buffer for storing characters input from the keyboard and not yet transmitted, the control means being operable in the event of the said absence of an echoed character to erase any characters stored in the buffer and their corresponding representations on the visual display means. Preferably the control means is arranged to inhibit transmission of a character until an echoed character corresponding to the immediately preceding transmitted character has been received.

BRIEF DESCRIPTION OF THE DRAWINGS

Some embodiments of the invention will now be described by way of example, with reference to the accompanying drawings, in which.

DETAILED DESCRIPTION OF EXEMPLARY EMBODIMENTS

Figure 1:
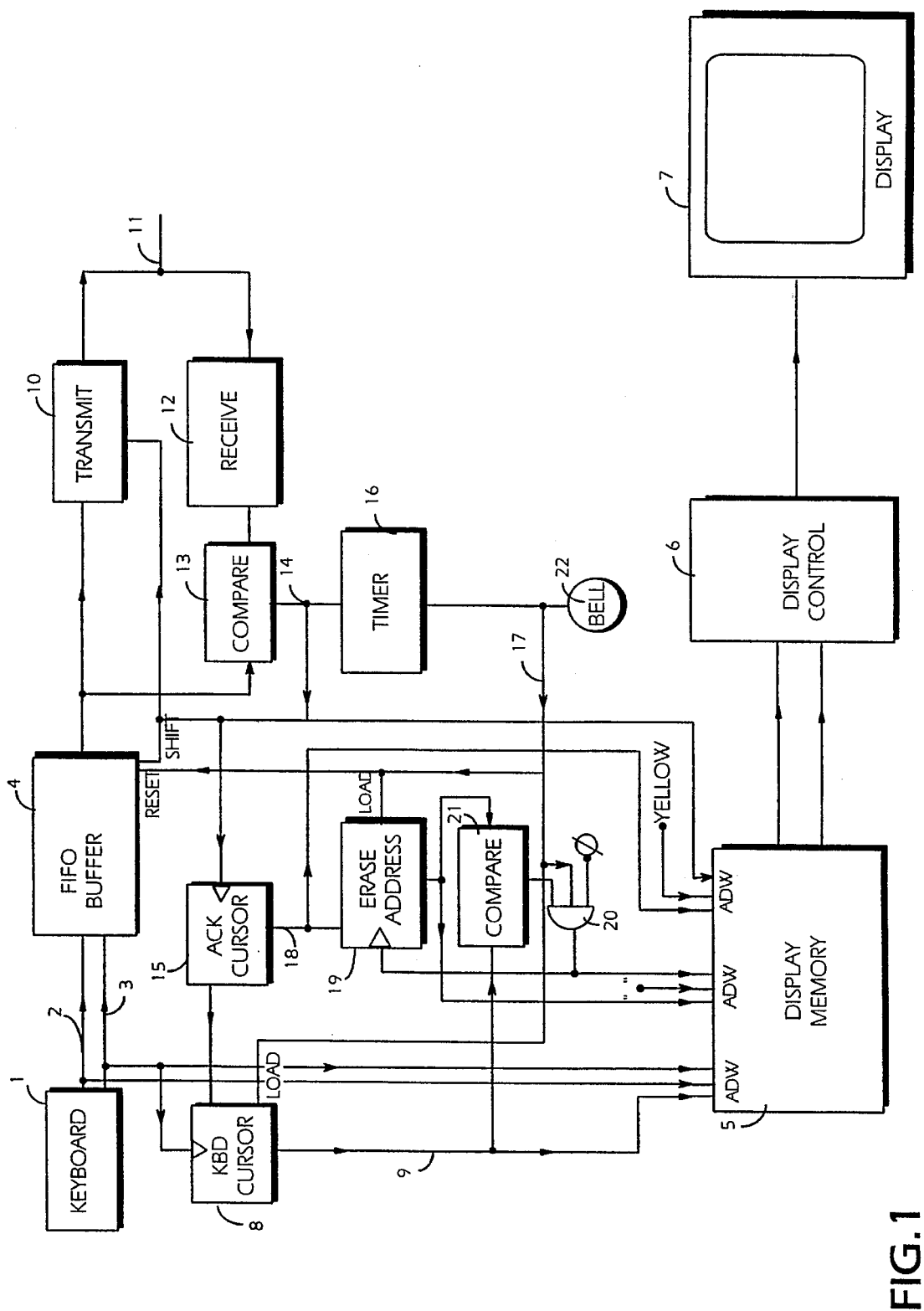
FIG. 1 is a block diagram of a terminal apparatus according to one embodiment of the present invention.

In the embodiment of FIG. 1, a keyboard 1 produces character codes on an output line 2 and indicates that a key has been pressed by means of a strobe signal on line 3, which serves to enter the character code into a first-in-first out buffer 4. The strobe signal is also connected to the write input of a display memory 5 where it is entered into an appropriate storage location. The display memory 5 has a location for each character position of a screen display, its contents being repeatedly read out by display control circuitry 6 to supply video signals to a video monitor 7.

A display memory address is held in a keyboard cursor register 8 and supplied to the display memory 5 via connections 9; after a character code from the keyboard has been entered into the display memory, the keyboard strobe signal on line 3 advances the address in the keyboard cursor register so that it holds the address for the next free character position on the display line.

A transmitter 10 receives character codes from the FIFO buffer 4 and transmits them in appropriately modulated form to a remote computer (not shown) via a line 11. The line 11 also forwards to a receiver 12 modulated character codes to be sent by way of acknowledgement by the remote computer. A code demodulated by the receiver 12 is passed to a comparator 13 which compares the received code with that present at the output of the FIFO buffer 4 (it being understood that, in this embodiment, the buffer 4 is not advanced until the acknowledgement has been received, so that a fresh character is not transmitted until the preceding character has been acknowledged).

In the event that a match is obtained, a "Yes" output signal is generated on a line 14. This signal serves:

(a) to remove the acknowledged code from the buffer 4;

(b) to signal to the transmitter 10 than it may read the next character from the buffer;

(c) (optionally) to signal confirmation to the display memory (see below); and (d) to advance the address held in an acknowledgement cursor register 15. This contains a display memory address which lags that contained in the keyboard cursor register 8; it "points" to the display memory location containing the oldest unacknowledged character code.

(e) to reset a timer 16. The timer 16 is arranged to produce a timeout signal following a period set to be a safe margin in excess of the expected time between transmission of a character and reception of the corresponding acknowledgement signal.

If no acknowledgement is received, or alternatively the acknowledgement is received in corrupted form, the "Yes" signal is not produced and the timer 16 produces the timeout signal (on line 17). This is connected to an erase arrangement (described below) to remove the character code at the location indicated (via line 18) by the address contained in acknowledgement cursor register 15, and any subsequent locations, thereby erasing the corresponding characters from the screen display 7. The line 17 is also connected to a Clear input of the buffer 4 to clear any character codes queued for transmission.

Figure 2:
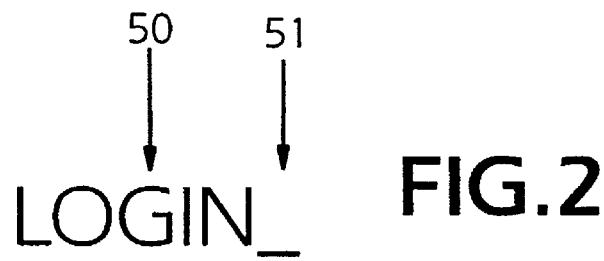
FIGS. 2 to 4 are diagrams illustrating the operation of the apparatus of FIG. 1.

To illustrate the operation thus described FIG. 2 shows a screen display after a user has typed the command "LOGIN" on the keyboard, with arrows (not part of the display) marking the positions pointed to by the keyboard cursor register and acknowledgement register assuming that the letters L and O have been acknowledged (shown here in bold type for clarity). Thus the acknowledgement cursor (arrow 50) is at the position of the 'G', the character currently awaiting acknowledgement whilst the keyboard cursor (arrow 51) is at the position immediately following the 'N'—i.e. the next available screen position. (A screen cursor —is shown here—means for generating this are not shown in FIG. 1 as it is entirely conventional). The character code for G is present at the output of the buffer 4. When an acknowledgement of the G—in the form of the appropriate code—is received by the comparator 13, the "Yes" signal on line 14 clears the 'G' from the buffer 4 (thereby making the 'I' code available to the transmitter 10) and inputs this fact to the transmitter. The timer 16 is reset (for timing acknowledgement of the ('I') and the acknowledgement cursor register 15 is advanced to point to the screen position occupied by the letter I, resulting in the display shown in FIG. 3. If, on the other hand, the 'G' acknowledgement is not received within the set time period, the timer 16 produces the timeout signal on line 17 which clears the letters 'GIN' from both the buffer 4 and the display memory 5. Additionally, line 17 is connected to a LOAD input of the keyboard register 8 so that it is reset (via a line 17) and loaded with the contents of the acknowledgement cursor register 15. The screen display (and cursor register contents) are then as shown in FIG. 4.

The erasure of the 'lost' characters from the display memory 5 will now be described in more detail.

The requirement is to erase all characters from the location indicated by the acknowledgement cursor up to the location indicated by the keyboard cursor. The timeout signal on line 17 causes loading of an erase address register 19 with the contents of the acknowledgement cursor address 15. The output of the former register is supplied as a display memory address to the display memory 5 whilst the timeout signal also enables an AND gate 20 to pass clock pulses Ø to the corresponding data input and to the erase address register to increment for successive write cycles. The display memory's data input is hard-wired to the code for a space. This process is terminated by a comparator 21 which compares the contents of the erase address register 19 with those of the keyboard cursor register 8 and when these are equal, inhibits a third input of the AND gate 20.

Figure 3:
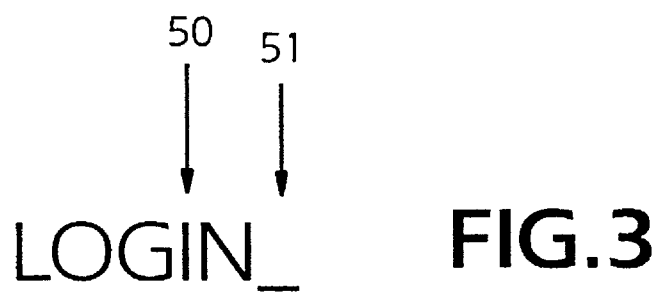
Figure 4:
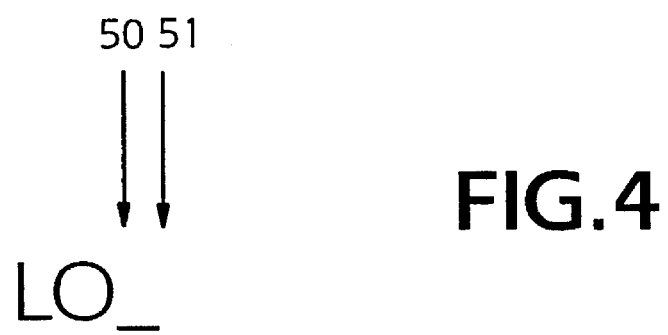

In FIGS. 2 to 4 the letters 'LO' are shown in bold type for the purposes of illustration. However, if desired, the acknowledged characters may be displayed in a different manner from those which remain unacknowledged. A facility for achieving this by means of different display echoing is provided in FIG. 1 by additional address, data and write inputs, which write only to a colour attribute portion of the addressed location and are fed with the acknowledgement cursor address, a code signifying "yellow" and the "Yes" signal respectively, so that the character being acknowledged, having initially been displayed in some other colour—perhaps green—is converted to yellow.

If required, the operation of clearing the buffer and unacknowledged screen characters may be signalled to a user by an audible warning such as a bell 22, as indeed may filling of the buffer 4.

If it is desired—for example in the case of particularly high delays in the send—acknowledge loop—not to delay transmission of each character until an acknowledgement of the preceding one has been received, then this may be achieved by a small modification to FIG. 1 in which the transmitter 10 receives character codes not from the buffer 4 but instead from an additional buffer in all respects similar to the buffer 4 except that it would not await the "Yes" signal on line 14 before passing further character codes to the transmitter 10. In this case the clearing operation (on both buffers) would involve erasing characters already transmitted and it would be wise to include provision for informing the remote computer that this has occurred.

Many of the functions of the apparatus may be implemented by a suitable sequence of programme instructions. A suitable flowchart is shown in FIGS. 5 and 6.

Figure 6:
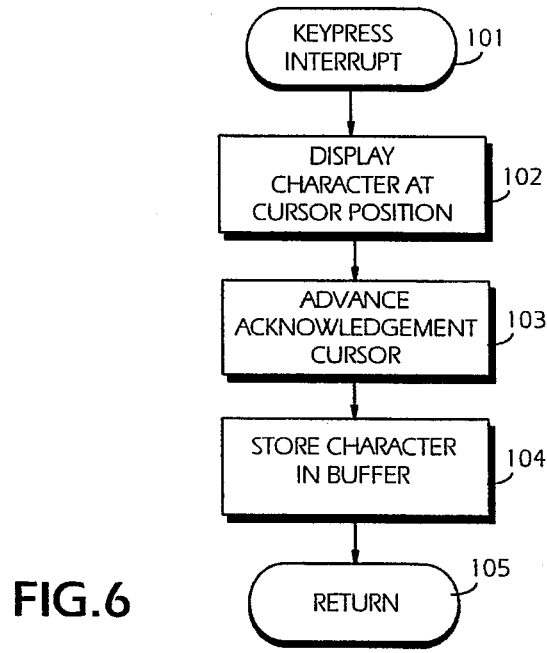

FIG. 6 shows that pressing a key generates an interrupt (101) following which the keypress is acknowledged to the user by displaying the corresponding character at the screen position indicated by the current keyboard cursor (102). The cursor is advanced to the next position (103). The character is then stored in the buffer (104), followed by a return from interrupt (105).

Figure 5:
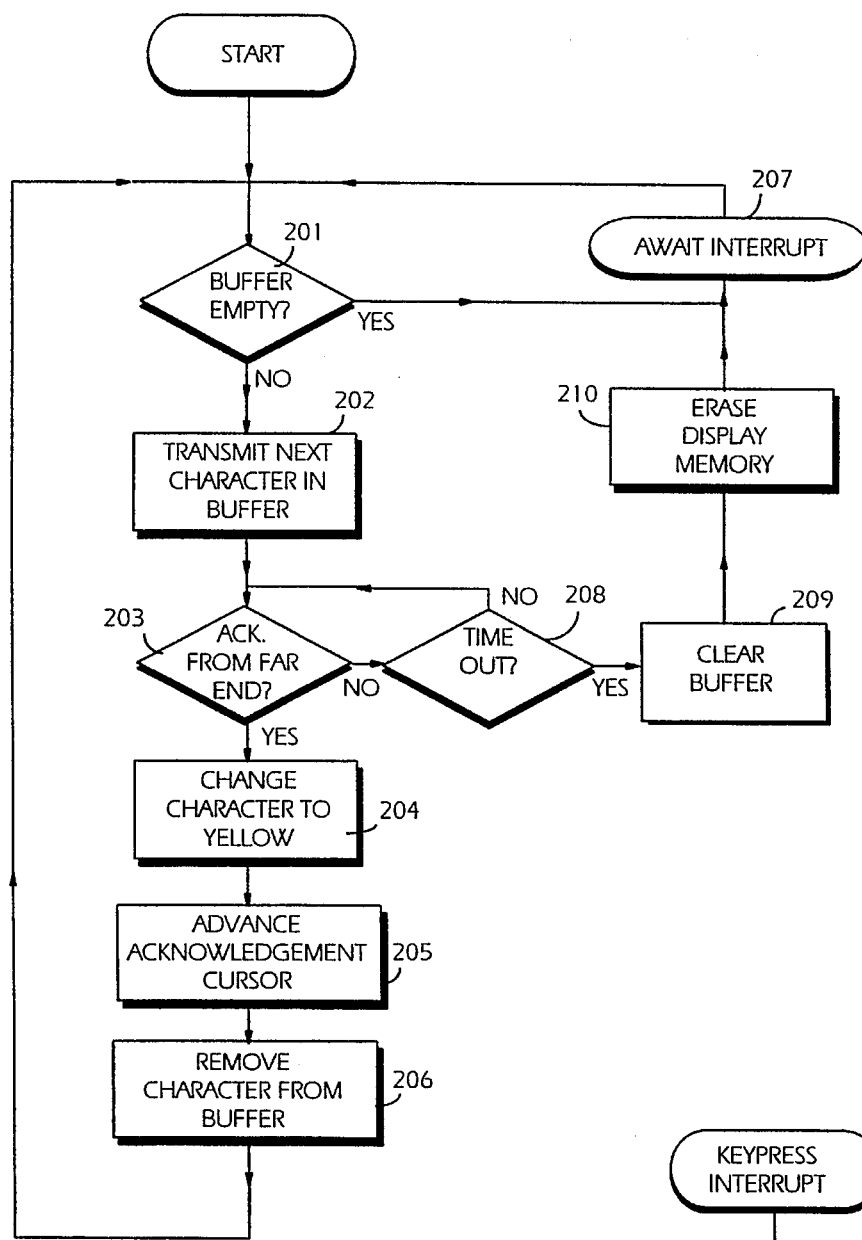
FIG. 5 and 6 are flowcharts illustrating the operation of a second embodiment of the invention.

Referring to FIG. 5, assuming that the buffer contains a character to be sent (checked at 201) then the character is transmitted 202. The acknowledgement is checked at 203 and if it is received: the character at the current acknowledgement position is changed to yellow at 204, the acknowledgement cursor is advanced at 205 and the character is removed at 206 from the buffer.

The process then returns to repeat the process from 201 of the buffer is empty the process is suspended at 207 until a keyboard interrupt occurs.

If an acknowledgement is not received the loop consisting of the acknowledgement check 203 and a time check 208 times out, whereupon the buffer is cleared at 209 and the character pointed to by the acknowledgement cursor, and those to the right of it, are erased at 210. The process then awaits at (207) further keyboard input.

I claim:

1. A data communication terminal comprising:

a keyboard for input of characters, transmitter means for transmitting coded signals representing those characters, receiver means for receiving echoed characters as a form of acknowledgement, visual display means operable to display characters, control means operable in response to an input signal from the keyboard to display the corresponding character on the visual display means and operable in the absence, within a defined time period, of receipt of a corresponding echoed character to erase the displayed character, a buffer for storing characters input from the keyboard and not yet transmitted, and the control means being operable in the event of the said absence of an echoed character to erase any characters stored in the buffer and their corresponding representations on the visual display means.

2. A terminal as in claim 1 in which the control means is arranged to inhibit transmission of a character until an echoed character corresponding to the immediately preceding transmitted character has been received.

3. A terminal as in claim 2 in which the control means is operable in response to receipt of an echoed character to change the appearance of the corresponding displayed character.

4. A terminal as in claim 1 in which the control means is operable in response to receipt of an echoed character to change the appearance of the corresponding displayed character.

5. A data communication process for use with a terminal having a keyboard for input of characters, a transmitter for transmitting coded signals representing those characters, a receiver for receiving echoed characters as a form of acknowledgement, and a visual display operable to display characters, said process comprising:

displaying a character on the visual display in response to an input signal from the keyboard, erasing the displayed character from the display in the absence, within a defined time period, of receipt of a corresponding echoed character, storing characters input from the keyboard and not yet transmitted, and in the event of the said absence of an echoed character, erasing any characters stored in the buffer and their corresponding representations on the visual display.

6. A process as in claim 5 in which the transmission of a character is inhibited until an echoed character corresponding to the immediately preceding transmitted character has been received.

7. A process as in claim 6 in which the appearance of the corresponding displayed character is changed in response to receipt of an echoed character.

8. A process as in claim 5 in which the appearance of the corresponding displayed character is changed in response to receipt of an echoed character.

9. A data communication and display process comprising the steps of:

generating character codes from a keyboard and transmitting them to a remote computer which transmits back corresponding acknowledgement codes;

displaying the generated characters without requiring receipt back from the remote computer of its corresponding acknowledgement code;

erasing a previously displayed character from the display if its corresponding acknowledgement code is not thereafter timely received from the remote computer, storing locally generated character codes in a local buffer memory prior to said transmitting step, and erasing a previously stored character code from said local buffer memory if its corresponding acknowledgement code is not thereafter timely received, from the remote computer.

10. A data communication and display process as in claim 9 further comprising:

delaying the transmission of a next-occurring character code to the remote computer from said local buffer memory until an acknowledgement code corresponding to the just-previously transmitted character code has been received from the remote computer.

11. A data communication and display process as in claim 10 further comprising:

changing the displayed appearance of a character in response to receipt of its corresponding acknowledgement code from the remote computer.

12. A data communication and display process as in claim 9 further comprising:

changing the displayed appearance of a character in response to receipt of its corresponding acknowledgement code from the remote computer.

* * * * *